: US 11,724,565 B2
(45) Date of Patent: Aug. 15, 2023

(12) United States Patent
Urano et al.

(54) CONTROLLING COMFORT COMPONENTS OF A VEHICLE BASED ON AN OCCUPANCY STATE (71) Applicant: TOYOTA RESEARCH INSTITUTE, INC., Los Altos, CA (US)

(72) Inventors: Hiromitsu Urano, Ann Arbor, MI (US); Kentaro Ichikawa, Ann Arbor, MI (US); Junya Ueno, Ann Arbor, MI (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 83 days.

(21) Appl. No.: 16/196,573

(22) Filed: Nov. 20, 2018

(65) Prior Publication Data

US 2020/0156436 A1 May 21, 2020

(51) Int. Cl.
*B60H 1/00* (2006.01)
*B60W 10/30* (2006.01)
*G06V 20/59* (2022.01)
*G06V 40/10* (2022.01)

(52) U.S. Cl.
CPC ..... *B60H 1/00742* (2013.01); *B60H 1/00778* (2013.01); *B60H 1/00971* (2013.01); *B60W 10/30* (2013.01); *G06V 20/593* (2022.01); *G06V 40/103* (2022.01); *B60W 2540/043* (2020.02)

(58) Field of Classification Search
CPC ...... B60W 50/14; B60W 10/04; B60W 30/18; B60W 40/09; G06F 9/453; G06N 20/00; G02B 27/01; G02B 2027/014
See application file for complete search history.

(56) References Cited

U.S. PATENT DOCUMENTS

| 8,626,381 | B2 | 1/2014 | Tate et al. | |
|---|---|---|---|---|
| 9,579,949 | B2 | 2/2017 | Patel | |
| 9,682,609 | B1 | 6/2017 | Dudar | |
| 2009/0018702 | A1* | 1/2009 | Oakes | G05B 15/02 700/276 |
| 2015/0210287 | A1* | 7/2015 | Penilla | B60W 40/08 701/49 |
| 2017/0057322 | A1 | 3/2017 | Kava et al. | |
| 2017/0080900 | A1* | 3/2017 | Huennekens | G05D 1/0088 |
| 2018/0022182 | A1 | 1/2018 | Miller et al. | |

FOREIGN PATENT DOCUMENTS

| DE | 102012216082 A1 * | 3/2014 | ........... B60N 2/5685 |
|---|---|---|---|
| GB | 2553189 A * | 2/2018 | ......... B60H 1/00764 |
| JP | 2010264938 A | 11/2010 | |

OTHER PUBLICATIONS

English Machine Translation of DE102012216082A1 (Year: 2012).*

* cited by examiner

*Primary Examiner* — Kenneth J Malkowski
*Assistant Examiner* — Andrew J Cromer
(74) *Attorney, Agent, or Firm* — Seyfarth Shaw LLP (57) ABSTRACT

A method for controlling a comfort component of a vehicle is presented. The method includes determining that the vehicle has arrived at a destination. The method also includes determining that the comfort component is activated. The method further includes deactivating the comfort component in response to determining that the comfort component is activated and the vehicle has arrived at the destination.

15 Claims, 6 Drawing Sheets

CONTROLLING COMFORT COMPONENTS OF A VEHICLE BASED ON AN OCCUPANCY STATE

BACKGROUND

Field

Certain aspects of the present disclosure generally relate to controlling comfort components and, more particularly, to a system and method for controlling comfort components of a vehicle based on a passenger's arrival status or pickup status.

Background

Vehicles include various comfort components, such as a heater, an air conditioner (AC), reading lights, seat heaters, etc., to improve a passenger's comfort. In a conventional vehicle, the comfort components may be manually or automatically activated. For example, when set to an auto mode, the AC may be activated when a cabin's temperature exceeds a threshold.

Some conventional vehicles activate comfort components before an occupied state, based on a passenger's estimated arrival time. The comfort components may remain activated during the duration of a trip. In some cases, the comfort components remain activated after the trip is completed and the passenger has exited the vehicle. The use of comfort components in an unoccupied vehicle may drain resources, such as a battery or fuel. There is a need to improve vehicles to consider both an occupied state and an unoccupied state when controlling comfort components.

SUMMARY

In one aspect of the present disclosure, a method for controlling a comfort component of a vehicle is disclosed. The method includes determining that the vehicle has arrived at a destination. The method also includes determining that the comfort component is activated. The method further includes deactivating the comfort component in response to determining that the comfort component is activated and the vehicle has arrived at the destination.

In another aspect of the present disclosure, a non-transitory computer-readable medium with non-transitory program code recorded thereon is disclosed. The program code is for controlling a comfort component of a vehicle. The program code is executed by a processor and includes program code to determine that the vehicle has arrived at a destination. The program code also includes program code to determine that the comfort component is activated. The program code further includes program code to deactivate the comfort component in response to determining that the comfort component is activated and the vehicle has arrived at the destination.

Another aspect of the present disclosure is directed to an apparatus for controlling a comfort component of a vehicle. The apparatus having a memory and one or more processors coupled to the memory. The processor(s) is configured to determine that the vehicle has arrived at a destination. The processor(s) is also configured to determine that the comfort component is activated. The processor(s) is further configured to deactivate the comfort component in response to determining that the comfort component is activated and the vehicle has arrived at the destination.

This has outlined, rather broadly, the features and technical advantages of the present disclosure in order that the detailed description that follows may be better understood. Additional features and advantages of the present disclosure will be described below. It should be appreciated by those skilled in the art that this present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

Vehicles include various driving conditions components and comfort components, such as an AC, a defroster, seat heaters, a fan, etc., to improve a passenger's comfort. The interface for the components may vary among vehicle brands, as well as among vehicles within the same brand. Due to the diversity in interfaces, a passenger may be unfamiliar with an interface when entering a new vehicle. Additionally, in ride share vehicles, such as a taxi, the passenger typically sits in one of the rear seats, thereby limiting their access to the interface.

Figure 1:
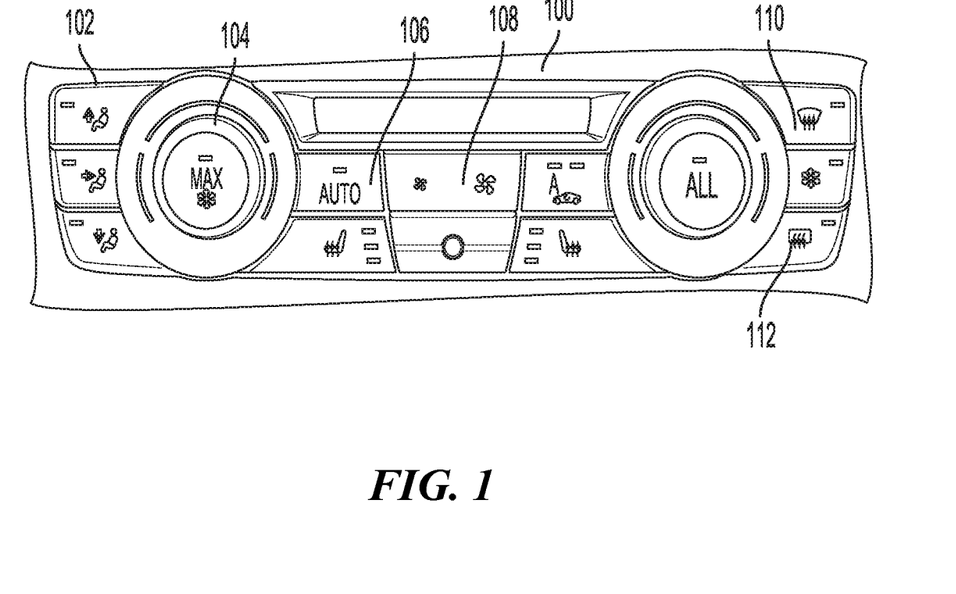
FIG. 1 illustrates an example of a comfort component interface according to aspects of the present disclosure.

FIG. 1 illustrates an example of an interface 100 for comfort components of a vehicle. As shown in FIG. 1, the interface 100 includes an air direction controller 102, a temperature controller 104, an auto climate controller 106, a fan speed controller 108, a front defrost controller 110, and a rear defrost controller 112. Before, or during an occupied state, a comfort component system of the vehicle may activate a comfort component. Furthermore, during the occupied state, the passenger may manually activate a comfort component via the interface 100.

In conventional personally owned vehicles, when a driver exits the vehicle, the vehicle is turned off, and the comfort components are deactivated. In contrast, an autonomous vehicle, such as an autonomous mobility-as-a-service (MAAS) vehicle (e.g., ride share vehicle), does not have a human driver. The autonomous vehicle may remain on after a passenger exits the vehicle and the comfort components may remain activated during the unoccupied state. The use of the comfort components during the unoccupied state may drain resources, such as battery power or fuel. It is desirable to control comfort components based on an occupancy state of the autonomous vehicle to improve battery life or fuel use. In the present application, the autonomous vehicle may be referred to as a vehicle. The vehicle may be an MAAS vehicle or a personally owned vehicle.

Aspects of the present disclosure are directed to activating and deactivating comfort components based on a vehicle's occupancy state. In one configuration, the vehicle turns off the comfort components when the vehicle has reached a destination. Alternatively, after the vehicle has reached the destination, the comfort components may remain on until an event has occurred, such as the vehicle's door opening and/or closing. In one embodiment, the comfort components are not deactivated if the vehicle has a pending passenger pickup.

Figure 2:
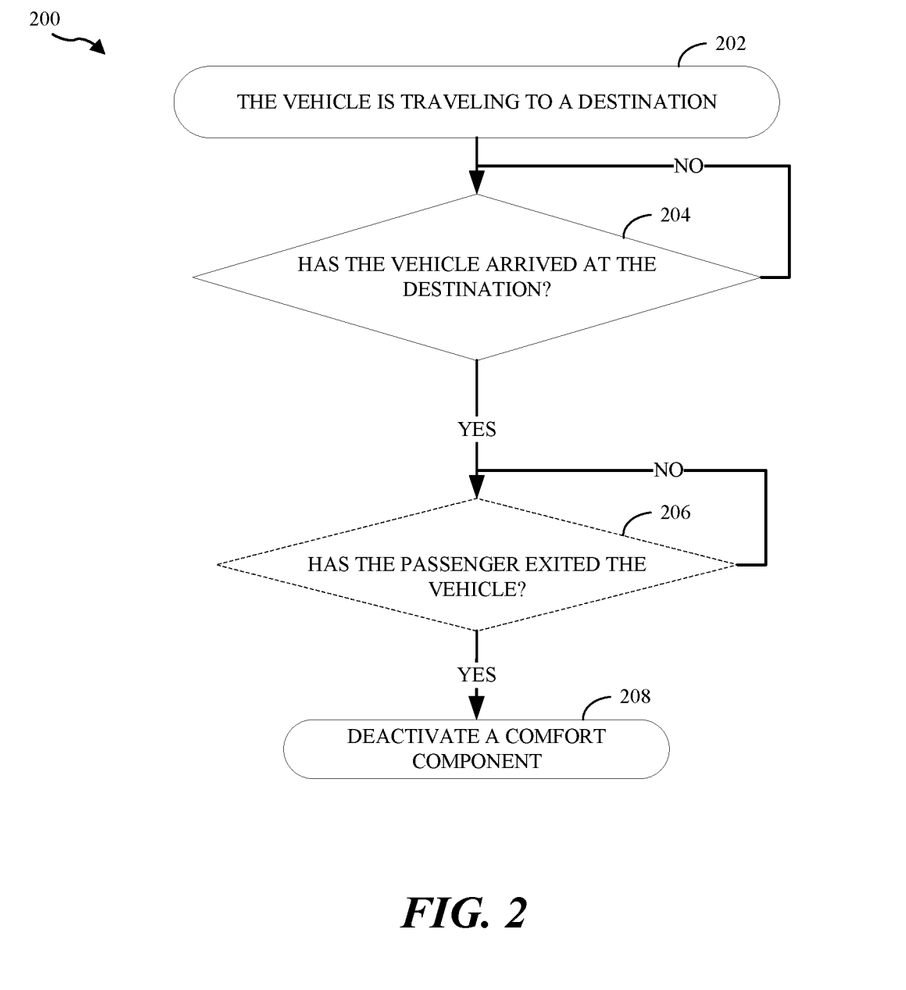
FIGS. 2, 3, and 4 illustrate flow diagrams for controlling comfort components according to aspects of the present disclosure.

FIG. 2 illustrates a flowchart 200 for controlling comfort components according to aspects of the present disclosure. As shown in FIG. 2, at block 202 the comfort component system detects that the vehicle is traveling to a destination. The vehicle may be operating in an autonomous mode or a manual mode when traveling to the destination. In the example of FIG. 2, it is assumed that the vehicle is occupied. The destination may be provided by the passenger before, or during, the trip. For example, the passenger may reserve the vehicle via a mobile device application and the destination may be provided during the reservation process. In the present example, a comfort component, such as a heater, is on during the trip. Aspects of the present disclosure are not limited to only activating one comfort component as multiple comfort components may be activated.

At block 204, the comfort component system determines if the vehicle has arrived at the destination. The determination may be based on location information, such as information provided via a global positioning system (GPS) sensor. In addition to, or alternate from, location information, the comfort component system may use the vehicle's motion or engine status to determine if the vehicle has arrived at the destination. For example, the comfort component system determines that the vehicle has arrived at the location when the engine is turned off and/or when the vehicle has stopped for a period of time.

If the vehicle has not arrived at the destination, the comfort component system continues to determine a destination arrival status (block 204). If the vehicle has arrived at the destination, in an optional configuration, at block 206, the comfort component system determines if the passenger has exited the vehicle. One or more triggers may be used to determine whether the passenger has exited the vehicle. These triggers include, but are not limited to, a door sensor detecting an opening and/or closing of a door, a pressure sensor detecting a change in pressure (e.g., weight) on the seat, a vision sensor, such as a camera, detecting a motion of the passenger exiting the vehicle, the engine turning on, the vehicle beginning another trip (e.g., resuming motion), and/or another trigger.

In one configuration, the opening and/or closing of the door adjacent to an occupied seat indicates that the passenger exited the vehicle. Additionally, each seat may include a pressure sensor. The pressure sensor detects a passenger's weight, thereby indicating that the seat is occupied. A change in pressure may indicate that the passenger exited the vehicle. The vehicle may also include one or more vision sensors, such as an RGB camera, to determine whether the passenger has exited the vehicle. The sensor(s) may capture an internal and/or external view of the vehicle. For example, an internal RGB camera may view the passenger exiting the vehicle, and an external RGB camera may view the passenger walking away from the vehicle. The captured images may be processed by a pre-trained neural network to determine whether the passenger has exited the vehicle.

In another example, the comfort component system detects whether the engine has changed from an off state to an on state. In yet another example, the comfort component system detects whether the vehicle has resumed movement after being stopped for a period of time. The change in engine state and/or the change from stopped to moving may indicate that the passenger has exited the vehicle.

One of the aforementioned triggers or any combination thereof may be used to determine whether the passenger has exited the vehicle. For example, when the seat pressure changes from an occupied pressure to an unoccupied pressure, the vehicle may further use the door opening/closing data and/or sensor data to determine whether the passenger has exited the vehicle. If the passenger has not exited the vehicle, the comfort component system continues to monitor the passenger's occupancy status while the vehicle is stopped at the destination (block 206). If the passenger has exited the vehicle, the comfort component system deactivates the comfort components (block 208). In one configuration, the comfort component system deactivates the comfort components when the vehicle arrives at the destination without determining whether the passenger has exited the vehicle.

In some cases, after the vehicle drops off the passenger, another passenger may enter the vehicle. For example, an MAAS vehicle may receive a new reservation before, or after, dropping off the current passenger. As another example, a personally owned vehicle may be used to pick up and drop off various family members. For example, a parent may control the vehicle to drop off one child at soccer practice and pick up another child from school. In one configuration, after the previous passenger has exited, the comfort component system does not deactivate the comfort components if a time until a subsequent passenger (e.g., reservation) is less than a threshold. The subsequent passenger's comfort may be improved due to a desirable environment obtained by maintaining a state of the comfort component in-between reservations.

Figure 3:
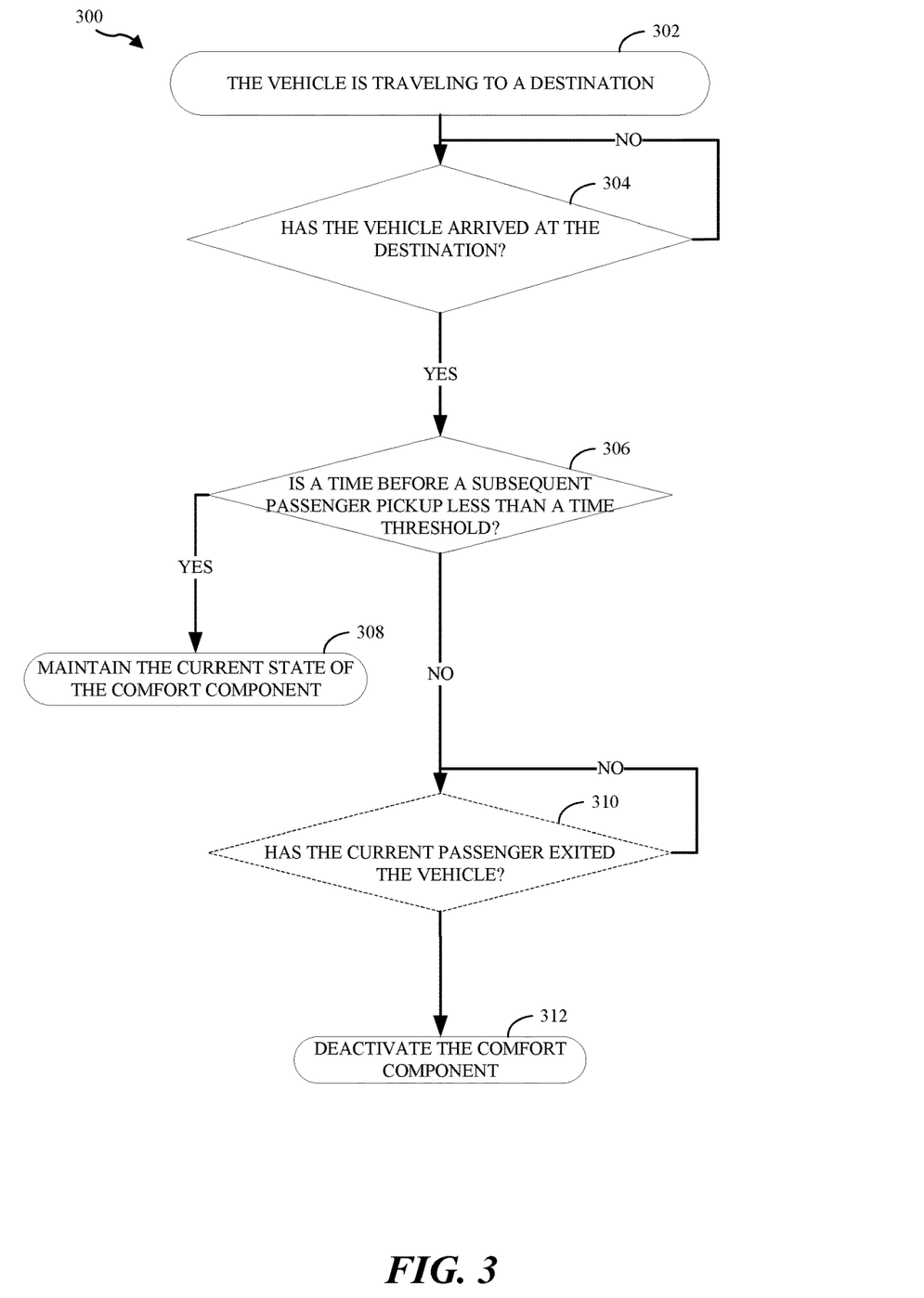

FIG. 3 illustrates a flowchart 300 for controlling comfort components for a vehicle according to aspects of the present disclosure. As shown in FIG. 3, at block 302 the comfort component system detects that the vehicle is traveling to a destination. The vehicle may be operating in an autonomous mode or a manual mode when traveling to the destination. In the example of FIG. 3, it is assumed that the vehicle is occupied. At block 304, the comfort component system determines whether the vehicle has arrived at the destination. If the vehicle has not arrived at the destination, the comfort component system continues to determine the vehicle's destination arrival status (block 304).

Alternatively, if the vehicle has arrived at the destination, the comfort component system determines if a time before a subsequent passenger is less than a time threshold (block 306). For example, based on a reservation from the subsequent passenger, the comfort component system determines a time when the subsequent passenger will enter the vehicle (e.g., MAAS vehicle). In this example, before reaching the current destination, the vehicle may receive a new reservation. The new reservation may designate a pickup location. The pickup location may be the same as the current destination (e.g., airport pickup/drop off location) or a different location (e.g., the subsequent passenger's house). Based on the subsequent passenger's location information and the vehicle's location information, the comfort component system may determine a time for the subsequent passenger to reach the vehicle or a time for the vehicle to reach the subsequent passenger.

If the time before the subsequent passenger is less than the time threshold, the comfort component system maintains the current state of the comfort component (e.g., keeps the comfort component activated) (block 308). If the time before the subsequent passenger is greater than the time threshold, the comfort component system deactivates the comfort component (block 312). In an optional configuration, prior to maintaining the current passenger's comfort, at block 310, the comfort component system determines whether the current passenger has exited the vehicle before deactivating the comfort component (block 312).

As discussed, one or more triggers may be used to determine whether the passenger has exited the vehicle. These triggers include, but are not limited to, a door sensor detecting an opening and/or closing of a door, a pressure sensor detecting a change in pressure (e.g., weight) on the seat, a vision sensor detecting a motion of the passenger exiting the vehicle, the engine turning on, the vehicle beginning another trip (e.g., resuming motion), and/or another trigger. If the current passenger has not exited the vehicle, the comfort component system continues to determine the passenger's occupancy status. If the current passenger has exited the vehicle, the comfort component system deactivates the comfort component (block 312).

Aspects of the present disclosure are not limited to determining whether the passenger has exited the vehicle after determining the time until the subsequent passenger. In an optional configuration, the comfort component system determines whether the passenger has exited the vehicle (block 310) before determining the time until the subsequent passenger (block 306). For example, the comfort component system may determine the time until the subsequent passenger after detecting that the current passenger has exited the vehicle.

In some cases, a passenger enters a vehicle at a designated pickup area, such as a taxi stand or a valet area. The vehicle travels to the pickup area to pick up a specific passenger, such as a passenger that previously reserved the vehicle. Alternatively, the vehicle may travel to the pickup area, such as a taxi stand, to wait until a passenger needs the vehicle. In most cases, when the vehicle arrives at the pickup area, a passenger's arrival is imminent.

According to another aspect of the present disclosure, the comfort component system activates a comfort component, such as an air conditioner, upon the vehicle's arrival at the pickup area. One or more sensor measurements, such as an internal temperature and external temperature, may be used to determine the appropriate comfort component to activate. For example, if the interior temperature is less than the exterior temperature, the comfort component system may activate the heater.

Figure 4:
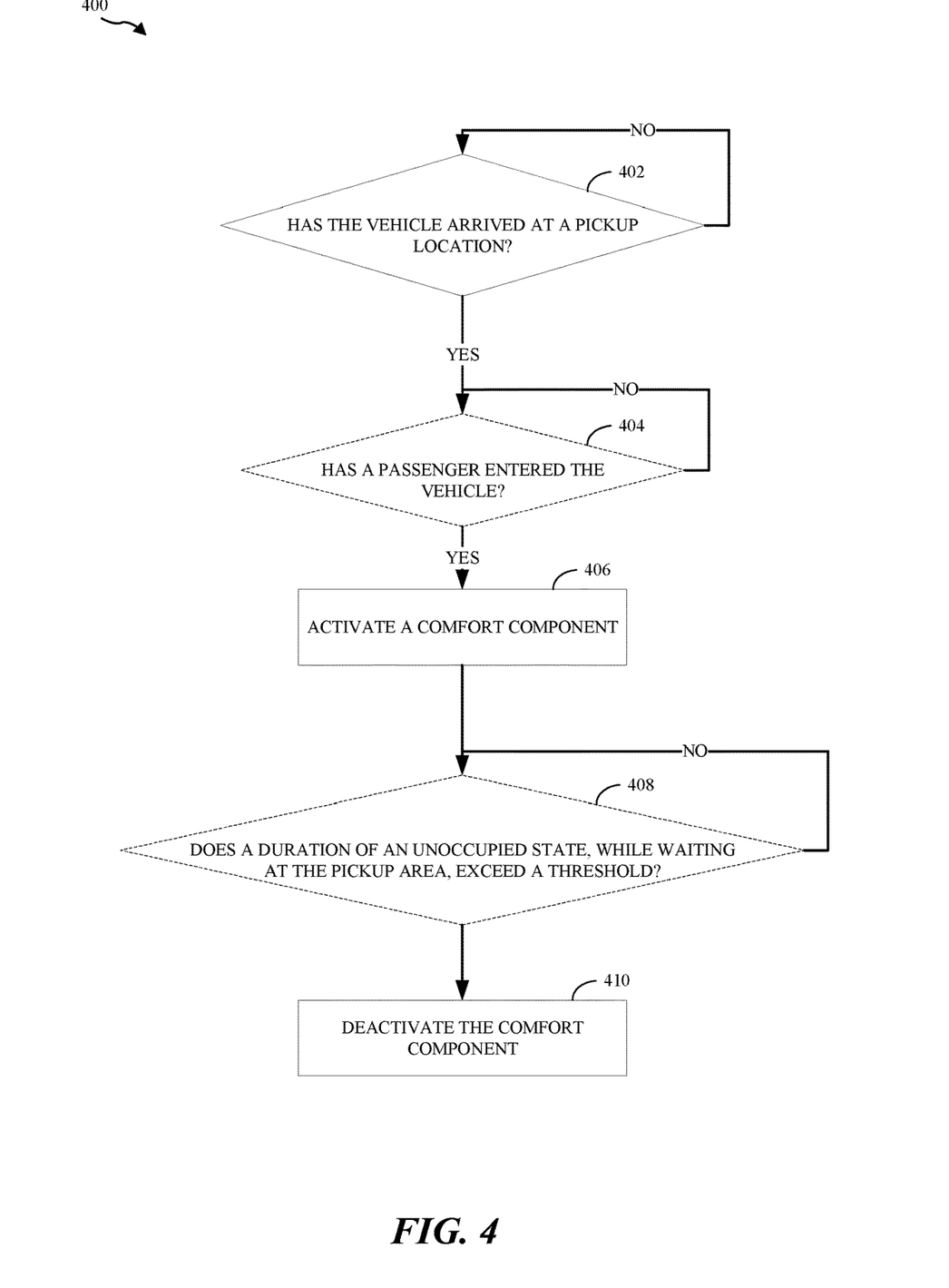

FIG. 4 illustrates an example of a flow diagram 400 for controlling a comfort component according to aspects of the present disclosure. As shown in FIG. 4, at block 402, the comfort component system determines if the vehicle has arrived at a pickup area. The vehicle's location and known pickup area locations may be used to determine whether the vehicle has arrived at a pickup area. The known pickup area locations may be stored in the vehicle's memory. If the vehicle has not arrived at the pickup area, the comfort component system continues to monitor the vehicle's location to determine whether it has arrived at the pickup area (block 402).

If the vehicle has arrived at the pickup area, the comfort component system may activate a comfort component (block 406). The comfort component system selectively activates the comfort component based on sensor measurements and/or a passenger's preferences. The passenger's preferences may be received with a passenger's reservation. For a personally owned vehicle, the passenger's preferences may be pre-set and stored in the vehicle's memory.

In an optional configuration, at block 404, before activating a comfort component, the comfort component system determines if a passenger has entered the vehicle after the vehicle's arrival at the pickup area. One or more triggers may be used to determine whether the passenger has entered the vehicle. These triggers include, but are not limited to, a door sensor detecting an opening and/or closing of a door, a pressure sensor detecting a change in pressure (e.g., weight) on the seat, a vision sensor, such as a camera, detecting a motion of the passenger entering or approaching the vehicle, the engine turning on, the vehicle beginning another trip (e.g., resuming motion), and/or another trigger.

If the passenger has entered the vehicle, the comfort component system activates one or more comfort components (block 406). In one configuration, the passenger may be previously known. For example, for an MAAS vehicle, the passenger may have previously reserved the vehicle. As another example, for a personally owned vehicle, the passenger may be the owner or a relative. The owner may provide upcoming passenger information to the vehicle. If the passenger has not entered the vehicle, the comfort component system continues to check whether a passenger has entered (block 404).

As discussed, in one configuration, the comfort component system activates one or more comfort components when the vehicle arrives at a pickup area. The current example is based on the vehicle autonomously arriving at the pickup area in an unoccupied state. In one optional configuration, rather than determining whether the passenger has entered the vehicle before activating the comfort component(s) (block 404), the comfort component system determines if a duration of an unoccupied state, while at the pickup area, exceeds a threshold (block 408). In this optional configuration, the comfort component system determines the duration of the unoccupied state after activating the comfort component (block 406).

That is, in this optional configuration, upon arrival at the pickup area, the comfort component system initiates a timer (not shown in FIG. 4) and also activates the comfort component (block 406). If the timer exceeds a time threshold, at block 410, the comfort component system deactivates the previously activated comfort component(s). If the timer has not exceeded the threshold, the comfort component system continues to monitor the timer (block 408). The timer ends when a passenger enters the vehicle. Furthermore, if one or more comfort components were deactivated due to the timer exceeding the threshold (block 410), the one or more comfort components are re-activated after a passenger enters the vehicle (not shown in FIG. 4).

According to yet another aspect of the present disclosure, the comfort components are reset to default settings when the vehicle arrives at a destination. The comfort component system may determine that the vehicle has arrived at a destination based on location information, such as information provided via a global positioning system (GPS) sensor. In addition to, or alternate from, location information, the comfort component system may use the vehicle's motion or engine status to determine if the vehicle has arrived at the destination. For example, the comfort component system determines that the vehicle has arrived at the location when the engine is turned off and/or when the vehicle has stopped for a period of time.

In this embodiment, the vehicle is occupied or unoccupied when arriving at the destination. Furthermore, the comfort components may be on or off before arriving at the destination. As discussed, after arriving at the destination, the comfort components may be deactivated. Furthermore, after arriving at the destination, the comfort components may be activated if a passenger's arrival time is less than a threshold.

In one configuration, regardless of whether the comfort components were previously on or off, upon arriving at the destination, the comfort components are reset to default settings. The default settings may include, but are not limited to, a default temperature, a default fan speed, a default air direction, and a default vent visor position. The default settings may be provided by a manufacturer of an MAAS vehicle or the owner of a personally owned vehicle. The default settings may be stored in the vehicle's memory.

In one configuration, the default settings are associated with a passenger based on one or more identifying characteristics of the passenger. The identifying characteristics may include, but are not limited to, the passenger's facial features, a unique identifier of the passenger's mobile device, and/or the passenger's weight/pressure. The passenger's facial features may be identified by an internal or external vehicle sensor, such as a red-green-blue (RGB) camera. The unique identifier of the passenger's mobile device may be identified when the phone connects to the vehicle. As an example, the unique identifier may be a phone number, Bluetooth™ ID, and/or a subscriber identification module (SIM) ID.

In some cases, the previous passenger may return to the vehicle. As such, resetting the comfort components to the default settings would be an inconvenience for the returning passenger. In one configuration, before resetting the comfort components to the default settings, the comfort component system determines whether a subsequent passenger is different from the previous passenger. The comfort component system may use different sensors and/or identification information to determine whether the subsequent passenger is different from the previous passenger.

In one configuration, one or more vehicle sensors are used to identify the passenger approaching or entering the vehicle. The passenger's identification information may be used to determine if the current passenger is different from the previous passenger. The identifying characteristics may include, but are not limited to, the passenger's facial features, a unique identifier of the passenger's mobile device, and/or the passenger's weight/pressure (or a combination thereof). For example, the RGB camera may capture an image of the person walking towards the vehicle. As another example, the unique identifier of the passenger's mobile device may be identified when the phone connects to the vehicle. Additionally, the passenger's weight may be determined by a seat pressure sensor when the passenger sits on a seat.

If the person is the same as the previous passenger, the previous comfort component settings are maintained. If the person is different, the comfort components are reset to the default settings. Additionally, the person may be different from the previous driver, still, the vehicle may recognize the person. In this situation, the comfort components are set to the settings corresponding to the recognized person. The comfort components' settings for each previous passenger may be stored in the vehicle's memory.

As another example, the passenger's mobile device location may be used to determine the likelihood of the passenger returning to the vehicle. Upon entering the vehicle, or reserving the vehicle, the comfort component system may connect with the mobile device. When the passenger exits the vehicle, the comfort component system may track the passenger's location. If the passenger leaves the mobile device in the car, or if the passenger's distance to the vehicle does not exceed a threshold, the comfort component system may determine that the passenger intends to return to the vehicle.

Alternatively, if the passenger's distance to the vehicle exceeds a threshold, the comfort component system may determine that the passenger does not intend to return to the vehicle. In some cases, the passenger's distance to the vehicle exceeds the threshold when the passenger is traveling on a trip (e.g., vacation). Thus, the comfort component system may consider the vehicle's current location, such as the passenger's home, long-term airport parking, vehicle return center, etc., to determine whether the passenger intends to return to the vehicle. If the comfort component system determines that the passenger is likely to return to the vehicle, the comfort components' current settings are maintained. Alternatively, if the comfort component system determines that the passenger is not expected to return to the vehicle, the comfort components are reset to the default settings.

In one configuration, before resetting a comfort component to a default setting, the comfort component system determines if a comfort component setting has changed. If a previous passenger did not change a comfort component from the default setting, the comfort component is not reset to the default setting. As discussed, changes to each comfort component may be stored in memory. By analyzing the changes stored in the memory, the comfort component system may determine whether a comfort component was changed from a default setting.

In one configuration, the interface for the vehicle's comfort components is provided via one or more touch panels. The touch panels may be distributed throughout the vehicle, such that a touch panel is accessible regardless of whether the passenger is in the front or rear seats. In another configuration, upon entering the vehicle, the passenger may control the vehicle's comfort components via their mobile device. In this configuration, the user's mobile device adjusts one or more comfort components based on a direct link to the vehicle or via uplink transmissions to the control center.

Furthermore, the functions described for turning off the comfort components, turning on the comfort components, and resetting the comfort components to the default settings may be combined as desired. The functions described above may be assigned to a single controller (e.g., button/interface). The controller may activate or deactivate features of the various aspects via a single control element. Finally, before deactivating the comfort component(s), the comfort component system may determine whether the comfort component(s) is activated.

Figure 5:
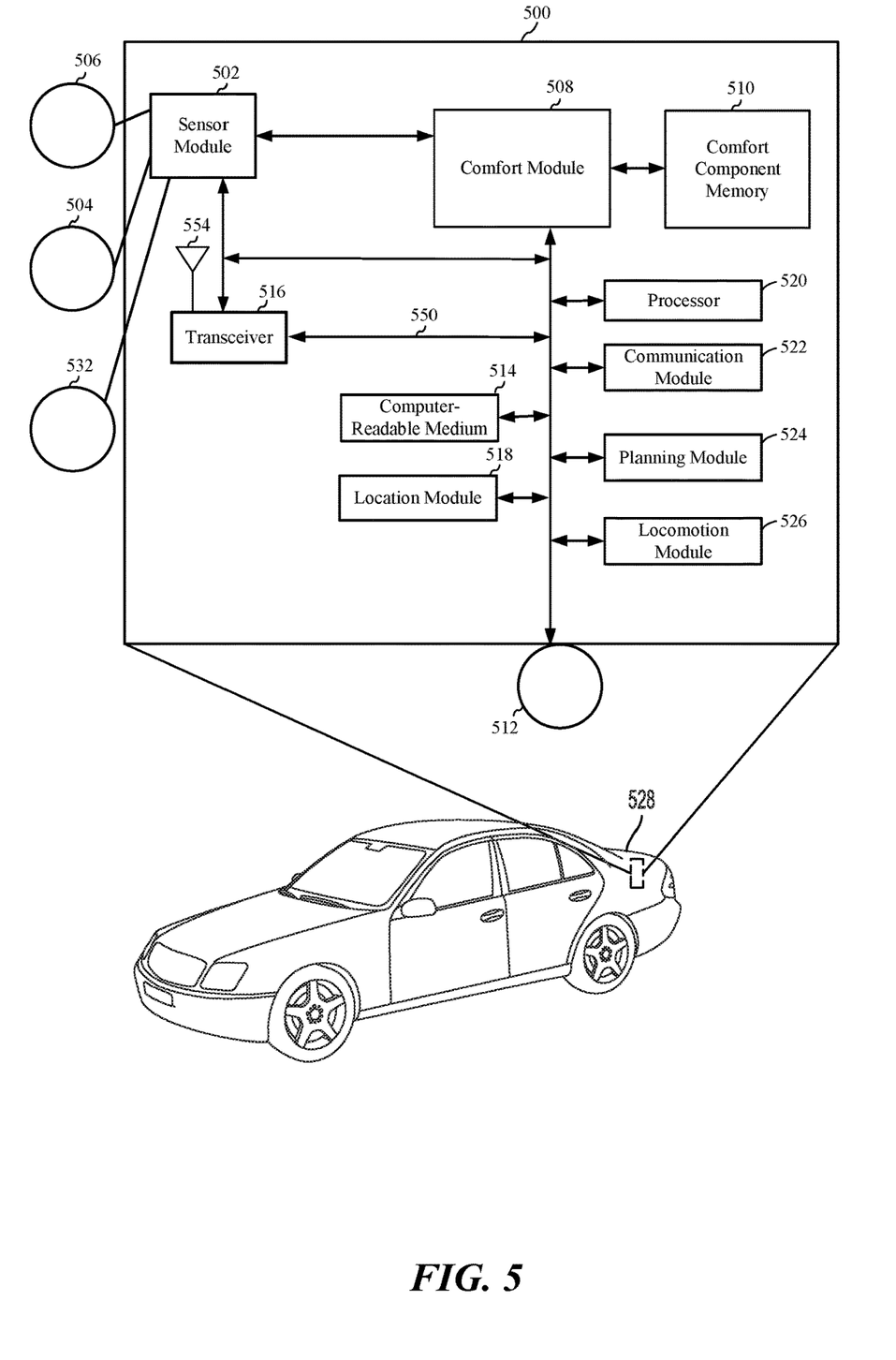
FIG. 5 is a diagram illustrating an example of a hardware implementation for a comfort component system according to aspects of the present disclosure.

FIG. 5 is a diagram illustrating an example of a hardware implementation for a comfort component system 500, according to aspects of the present disclosure. The comfort component system 500 may be a component of a vehicle, a robotic device, or another device. For example, as shown in FIG. 5, the comfort component system 500 is a component of a vehicle 528. Aspects of the present disclosure are not limited to the comfort component system 500 being a component of the vehicle 528, as other devices, such as a bus, boat, drone, or robot, are also contemplated for using the comfort component system 500.

The vehicle 528 may be autonomous, semi-autonomous, or non-autonomous. Furthermore, the vehicle 528 may an MAAS vehicle or a personally owned vehicle. Additionally, the vehicle's 528 may use an electric system, hybrid system, combustion engine, or another type of system for propulsion. The modules of the comfort component system 500 may be software modules running in the processor 520, resident/stored in the computer-readable medium 514, one or more hardware modules coupled to the processor 520, or some combination thereof.

The comfort component system 500 may be implemented with a bus architecture, represented generally by a bus 550. The bus 550 may include any number of interconnecting buses and bridges depending on the specific application of the comfort component system 500 and the overall design constraints. The bus 550 links together various circuits including one or more processors and/or hardware modules, represented by a processor 520, a communication module 522, a location module 518, a sensor module 502, a locomotion module 526, a navigation module 524, and a computer-readable medium 514. The bus 550 may also link various other circuits such as timing sources, peripherals, voltage regulators, and power management circuits, which are well known in the art, and therefore, will not be described any further.

The comfort component system 500 includes a transceiver 516 coupled to the processor 520, the sensor module 502, a comfort component module 508, the communication module 522, the location module 518, the locomotion module 526, the navigation module 524, and the computer-readable medium 514. The transceiver 516 is coupled to an antenna 554. The transceiver 516 communicates with various other devices over a transmission medium. For example, the transceiver 516 may receive commands via transmissions from a user or a remote device. As another example, the transceiver 516 may transmit driving statistics and information from the comfort component module 508 to a server (not shown).

The comfort component system 500 includes the processor 520 coupled to the computer-readable medium 514. The processor 520 performs processing, including the execution of software stored on the computer-readable medium 514 providing functionality according to the disclosure. The software, when executed by the processor 520, causes the comfort component system 500 to perform the various functions described for a particular device, such as the vehicle 528, or any of the modules 502, 514, 516, 518, 520, 522, 524, 526. The computer-readable medium 514 may also be used for storing data that is manipulated by the processor 520 when executing the software.

The sensor module 502 may be used to obtain measurements via different sensors, such as a first vision sensor 506, a second vision sensor 504, and/or a seat sensor 532. The first vision sensor 506 may be a stereoscopic camera or an RGB camera, for capturing 2D images. The first vision sensor 506 may be an internal sensor. The second vision sensor 504 may be defined external to the vehicle 528 to capture an image of an approaching person. The second vision sensor 504 may also detect passengers that exit the vehicle 528. The seat sensor 532 detects weight on a seat. Each seat in the vehicle 528 may include a seat sensor 532. The seat sensor 532 may be incorporated into or on a seat cushion.

The vehicle 528 may include other sensors to improve navigation, such as a ranging sensor, a light detection and ranging (LIDAR) sensor, or a radio detection and ranging (RADAR) sensor. Of course, aspects of the present disclosure are not limited to the aforementioned sensors as other types of sensors, such as, for example, thermal, sonar, and/or lasers are also contemplated for either of the vision sensors 504, 506. The measurements of the first vision sensor 506, the second vision sensor 504, and the seat sensor 532 may be processed by one or more of the processor 520, the sensor module 502, the communication module 522, the location module 518, the locomotion module 526, the navigation module 524, in conjunction with the computer-readable medium 514 to implement the functionality described herein. In one configuration, the data captured by the first vision sensor 506, the second vision sensor 504, and the seat sensor 532 may be transmitted to an external device via the transceiver 516.

The location module 518 may be used to determine a location of the vehicle 528. For example, the location module 518 may use a global positioning system (GPS) to determine the location of the vehicle 528. The communication module 522 may be used to facilitate communications via the transceiver 516. For example, the communication module 522 may be configured to provide communication capabilities via different wireless protocols, such as WiFi, long term evolution (LTE), 4G, etc. The communication module 522 may also be used to communicate with other components of the vehicle 528 that are not modules of the comfort component system 500.

The locomotion module 526 may be used to facilitate locomotion of the vehicle 528. As an example, the locomotion module 526 may control the movement of the wheels. As another example, the locomotion module 526 may be in communication with a power source of the vehicle 528, such as an engine or batteries. Of course, aspects of the present disclosure are not limited to providing locomotion via wheels and are contemplated for other types of components for providing locomotion, such as propellers, treads, fins, and/or jet engines.

The comfort component system 500 includes a comfort component module 508 in communication with a comfort component memory 510. The comfort component memory 510 may be distinct from a memory of the vehicle (not shown) or may be included as part of the vehicle memory. The comfort component module 508 may be in communication with a comfort component control module. The comfort component control module 512 controls one or more comfort components, such as the air conditioner, the heater, the fan, the fan speed, the air direction, and the vent visor direction. The comfort component module 508 may also be in communication with the sensor module 502, the transceiver 516, the processor 520, the communication module 522, the location module 518, the locomotion module 526, the navigation module 524, and the computer-readable medium 514.

In one configuration, a passenger adjusts one or more comfort components via an interface (not shown) in communication with the comfort component control module 512. The comfort component control module 512 may transmit the comfort component adjustments to the comfort component module 508, such that the comfort component adjustments are stored in the comfort component memory 510. The comfort component module 508 may associate the comfort component settings with a passenger profile in the comfort component memory 510.

The passenger profile may include personal identification information and/or user device identification information. The personal identification information may be obtained from passenger information obtained via the transceiver 516 and/or communication module 522 when the passenger reserves an MAAS vehicle. The personal identification information may also be obtained from a passenger during registration of their personally owned vehicle. The personal identification information may also include facial identification information captured by the first vision sensor 506 and/or the second vision sensor 504. The personal identification information may further include weight/pressure information captured by the seat sensor 532. The user device identification information may be obtained via the transceiver 516 and/or communication module 522 when the passenger reserves an MAAS vehicle and/or when the passenger's device establishes a connection (e.g., Bluetooth™ connection) with the vehicle 528.

The comfort component module 508 may use information received from one or more of the location module 518, the navigation module 524, and the locomotion module 526 to determine when the vehicle 528 has stopped. For example, the navigation module 524 and/or location module 518 may indicate that the vehicle 528 has arrived at a pre-set destination, such as the passenger's house or a ride share destination. The locomotion module 526 may indicate that the vehicle 528 has stopped and the engine has been turned off.

The comfort component module 508 may deactivate the comfort components if the vehicle 528 has arrived at a destination. Additionally, the comfort component module 508 may receive reservation information from the transceiver 516, the navigation module 524, the communication module 522, the processor 520, and/or the computer-readable medium 514. After arriving at a destination, the comfort component module 508 may use the reservation information to determine a time until a next reservation. If the time until the next reservation is less than a threshold, the comfort component module 508 does not deactivate the comfort components.

The comfort component module 508 may use information received from one or more of the location module 518, the navigation module 524, and the locomotion module 526 to determine when the vehicle 528 is at a pickup area. In one configuration, the comfort component module 508 may activate the comfort components upon arrival at the pickup area. Additionally, the comfort component module 508 may use information from the processor 520, seat sensor 532, and/or sensors 504, 506 to determine whether the vehicle 528 is unoccupied and an occupancy duration. If the occupancy duration is greater than a threshold, the comfort component module 508 deactivates the comfort components.

In response to determining that the vehicle 528 has stopped, the comfort component module 508 may determine whether the passenger has exited or entered the vehicle 528. The comfort component module 508 may use information received from the sensor module 502 and/or the processor 520 to determine whether the passenger has exited or entered the vehicle 528. For example, the seat sensor 532 may identify a change in seat pressure, thereby indicating that the passenger has left the seat or sat on the seat. As another example, the first vision sensor 506 and the second vision sensor 504 may capture images of the passenger exiting or entering the vehicle. In yet another example, the processor 520 may indicate that a door has opened and closed.

In one configuration, in response to determining that the passenger has exited the vehicle, the comfort component module 508 turns off the comfort components via the comfort component control module 512. The comfort component module 508 may also set the comfort components to default settings via the comfort component control module 512. The default settings may be stored in the comfort component module 508.

Before setting the comfort components to their default settings, the comfort component module 508 may receive information from the sensor module 506 and/or the communication module 522 to determine if an approaching person is a previous passenger. For example, the sensor module 506 may transmit one or more images of an approaching person captured by the second vision sensor 504. Aspects of the present disclosure are not limited to a single second vision sensor 504. The vehicle 528 may include multiple second vision sensors 504 to capture images of an environment surrounding the vehicle 528. The image(s) may be compared with passenger identification information in the comfort component memory 510 to determine if the approaching person is a previous passenger.

As another example, the communication module 522 may transmit a location (e.g., GPS location) of a user device as well as user device identification information. The user device identification information may be compared with user device identification information stored in the comfort component memory 510. The user device location may be compared with the vehicle's 528 location obtained from the location module 518 to determine if a person's distance to the vehicle 528 is less than a threshold. In one configuration, if the user device identification information corresponds to a previous passenger and the person's distance is less than the threshold, the comfort components' current settings are maintained.

In another configuration, when the passenger exits the vehicle 528, the comfort component module 508 predicts whether the passenger will return to the vehicle 528. The prediction may be based on a current location of the vehicle 528, a time remaining for a reservation, whether other passengers remain in the vehicle 528, and/or other factors. The comfort components' current settings are maintained if the passenger is predicted to return to the vehicle.

For example, the location module 518 and/or navigation module 524 may provide trip information to the comfort component module 508. The trip information may indicate the vehicle's 528 current location and services within a vicinity of the current location. If the location is near a service, such as a gas station, bank, shopping mall, restaurant, etc., the comfort component module 508 predicts that the passenger has exited to use the service. As such, the passenger will most likely return to the vehicle 528.

As another example, the comfort component module 508 may receive reservation information from the transceiver 516, the navigation module 524, the communication module 522, the processor 520, and/or the computer-readable medium 514. The reservation information provides information regarding a remaining time for a passenger's reservation. For example, the passenger may have reserved the vehicle 528 for a one-way route to a destination. As another example, the passenger may have reserved the vehicle 528 for a time period, such as twenty-four hours. If there is time remaining on the reservation, the comfort component module 508 may determine that the passenger is likely to return to the vehicle.

If the comfort component module 508 determines that the passenger is likely to return to the vehicle, the comfort components' current settings are maintained. Alternatively, if the comfort component module 508 determines that the passenger is not likely to return to the vehicle, the comfort component module 508 signals the comfort component control module 512 to return the comfort components to their default settings. The default settings may be stored in the comfort component memory 510.

According to aspects of the present disclosure, the comfort component module 508 is configured for determining whether the vehicle 528 has arrived at a destination, determining whether the comfort component is activated, and deactivating the comfort component in response to determining that the comfort component is activated and the autonomous vehicle 528 has arrived at a destination. The comfort component module 508 may also be configured for determining whether a passenger has exited the autonomous vehicle based on a door sensor, a seat pressure sensor, a visual sensor, and/or a motion of the vehicle 528. Furthermore, the comfort component module 508 may be configured for identifying, after the passenger has exited the vehicle 528, a person approaching the vehicle 528, and setting the comfort component to a default setting when the person is different from the passenger. The comfort component module 508 may be further configured for determining a duration until a subsequent passenger will enter the autonomous vehicle.

Figure 6:
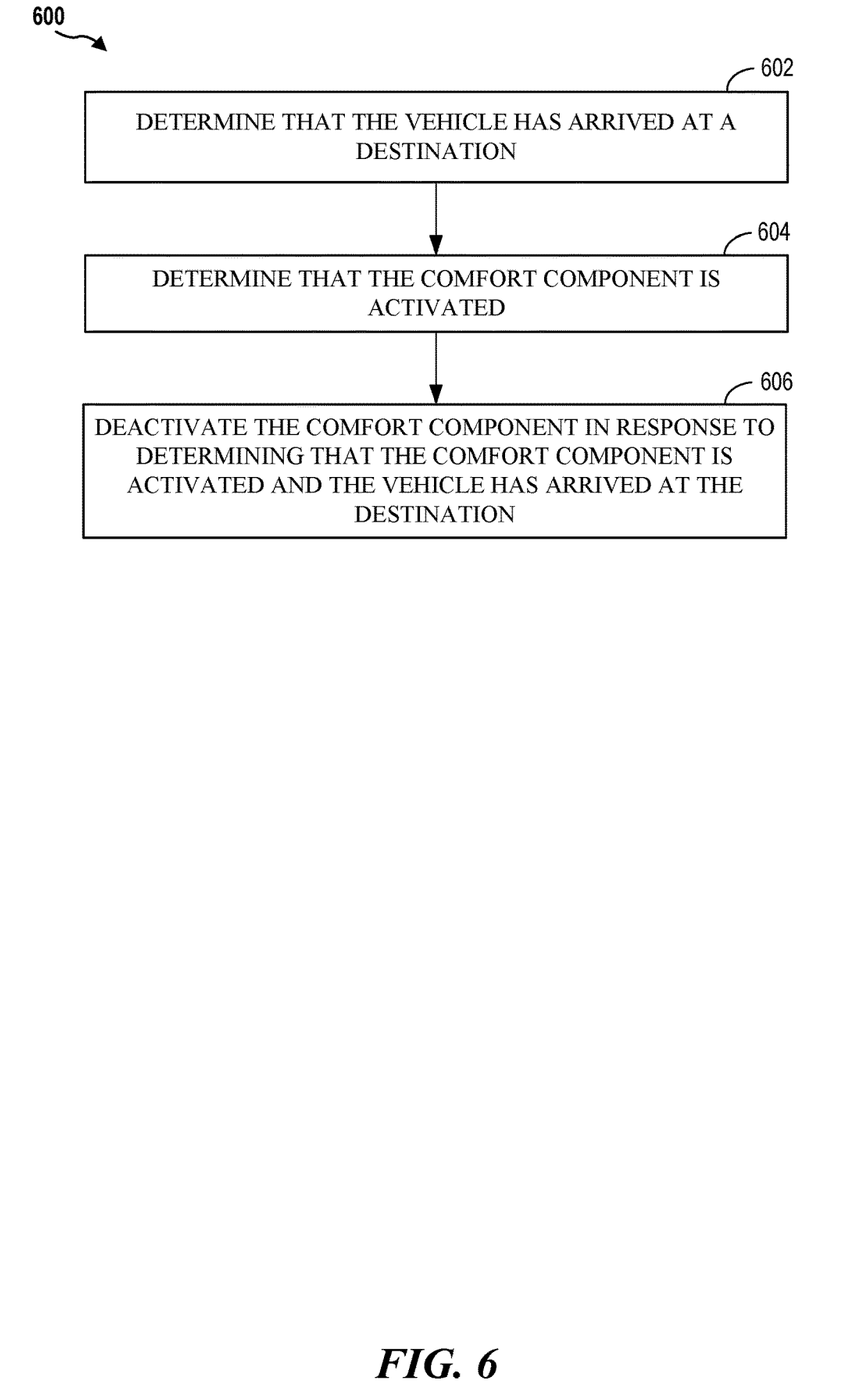
FIG. 6 illustrates a flow diagram for a method for controlling a comfort component system according to aspects of the present disclosure.

FIG. 6 illustrates a method 600 for controlling a comfort component of a vehicle, according to an aspect of the present disclosure. As shown in FIG. 6, at block 602 a comfort component system determines that the vehicle has arrived at a destination. The vehicle may be an autonomous vehicle or a semi-autonomous vehicle. Additionally, the vehicle may arrive at the destination in an autonomous mode or a manual mode (e.g., driven by a human). The comfort component system may determine that the vehicle has arrived at the destination based on a motion of the vehicle and/or a location sensor.

At block 604, upon arriving at the destination, the comfort component system determines that the comfort component is activated. Furthermore, at block 606, the comfort component system deactivates the comfort component in response to determining that the comfort component is activated and the vehicle has arrived at the destination. The comfort component may be a temperature adjuster, a fan, a fan speed, an air direction, a seat heater, a seat cooler, or another comfort component.

In an optional configuration, the comfort component system determines that a passenger has exited the vehicle. The determination may be based on one or more of a door sensor, a seat pressure sensor, a visual sensor, motion of the vehicle. In this optional configuration, the comfort component system deactivates the comfort component is deactivated after the passenger has exited the autonomous vehicle.

Additionally, after deactivating the comfort component, the comfort component system may identify, after the passenger has exited the vehicle, a person approaching the vehicle. If the person is different from the previous passenger, the comfort component is set to a default setting. If the person is the same as the previous passenger, the comfort component may be re-activated. The person may be identified based an input received from a visual sensor and/or a location sensor.

In another optional configuration, after arriving at the destination, the comfort component system determines a duration until a subsequent passenger will enter the vehicle. If the duration is less than a threshold, the comfort component remains activated. Alternatively, the comfort component is deactivated if the duration is greater than the threshold.

Based on the teachings, one skilled in the art should appreciate that the scope of the present disclosure is intended to cover any aspect of the present disclosure, whether implemented independently of or combined with any other aspect of the present disclosure. For example, an apparatus may be implemented, or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure rather than limiting, the scope of the present disclosure being defined by the appended claims and equivalents thereof.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a processor specially configured to perform the functions discussed in the present disclosure. The processor may be a neural network processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. Alternatively, the processing system may comprise one or more neuromorphic processors for implementing the neuron models and models of neural systems described herein. The processor may be a microprocessor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or such other special configuration, as described herein.

The steps of a method or algorithm described in connection with the present disclosure may be embodied directly in hardware, in a software module executed by a processor, or in a combination of the two. A software module may reside in storage or machine readable medium, including random access memory (RAM), read only memory (ROM), flash memory, erasable programmable read-only memory (EPROM), electrically erasable programmable read-only memory (EEPROM), registers, a hard disk, a removable disk, a CD-ROM or other optical disk storage, magnetic disk storage or other magnetic storage devices, or any other medium that can be used to carry or store desired program code in the form of instructions or data structures and that can be accessed by a computer. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Software shall be construed to mean instructions, data, or any combination thereof, whether referred to as software, firmware, middleware, microcode, hardware description language, or otherwise.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The machine-readable media may comprise a number of software modules. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into the cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any storage medium that facilitates the transfer of a computer program from one place to another.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means, such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for controlling a comfort component of a vehicle, comprising:
  capturing an image of a first passenger approaching the vehicle via one or more sensors of the vehicle;

setting the comfort component to a default state based on an identity of the first passenger being different from an identity of a previous passenger, the identity of the first passenger being determined based on the image;

receiving an input to adjust a temperature within the vehicle to a first passenger desired temperature, the input being received while the first passenger is occupying the vehicle;

setting the comfort component, while the first passenger is occupying the vehicle, to an active state to adjust the temperature to the first passenger desired temperature based on receiving the input;

determining the first passenger exited the vehicle at a passenger drop-off location after activating the comfort component;

determining an amount of time between the first passenger exiting the vehicle and the subsequent pick-up for a second passenger based on determining the first passenger exited the vehicle, the second passenger being different than the first passenger; and controlling the comfort component based on the amount of time between the first passenger exiting the vehicle and the subsequent pick-up for the second passenger, the controlling comprising:

setting the comfort component to a deactivated state based on the amount of time being greater than a time threshold and the first passenger exiting the vehicle, the deactivated state being maintained until the second passenger enters the vehicle; and maintaining the comfort component in the active state based on the amount of time being less than the time threshold and the first passenger exiting the vehicle, such that the temperature within the vehicle is maintained at the first passenger desired temperature until the second passenger enters the vehicle.

2. The method of claim 1, further comprising determining the first passenger exited the vehicle based on an indication from at least one of a door sensor, a seat pressure sensor, a visual sensor, a vehicle motion sensor, or a combination thereof.

3. The method of claim 1, further comprising determining the vehicle arrived at the passenger drop-off location based on at least one of a motion of the vehicle, an indication from a location sensor, or a combination thereof.

4. The method of claim 1, in which the comfort component includes one or more of a temperature adjuster, a fan, a fan speed, an air direction, a seat heater, or a seat cooler.

5. The method of claim 1, in which the comfort component is in the deactivated state prior to the first passenger entering the vehicle.

6. An apparatus for controlling a comfort component of a vehicle, the apparatus comprising:

a memory; and at least one processor coupled to the memory, the at least one processor configured:

to capture an image of a first passenger approaching the vehicle via one or more sensors of the vehicle;

to set the comfort component to a default state based on an identity of the first passenger being different from an identity of a previous passenger, the identity of the first passenger being determined based on the image;

to receive an input to adjust a temperature within the vehicle to a first passenger desired temperature, the input being received while the first passenger is occupying the vehicle;

to activate set the comfort component, while the first passenger is occupying the vehicle, to an active state to adjust the temperature to the first passenger desired temperature based on receiving the input;

to determine the first passenger exited the vehicle at a passenger drop-off location after activating the comfort component;

to determine an amount of time between the first passenger exiting the vehicle and the subsequent pick-up for a second passenger based on determining the first passenger exited the vehicle, the second passenger being different than the first passenger; and to control the comfort component based on the amount of time between the first passenger exiting the vehicle and the subsequent pick-up for the second passenger, the controlling comprising:

setting the comfort component to a deactivated state based on the amount of time being greater than a time threshold and the first passenger exiting the vehicle, the deactivated state being maintained until the second passenger enters the vehicle; and maintaining the comfort component in the active state based on the amount of time being less than the time threshold and the first passenger exiting the vehicle, such that the temperature within the vehicle is maintained at the first passenger desired temperature until the second passenger enters the vehicle.

7. The apparatus of claim 6, in which the at least one processor is further configured to determine the first passenger exited the vehicle based on an indication from at least one of a door sensor, a seat pressure sensor, a visual sensor, a vehicle motion sensor, or a combination thereof.

8. The apparatus of claim 6, in which the at least one processor is further configured to determine the vehicle arrived at the passenger drop-off location based on at least one of a motion of the vehicle, an indication from a location sensor, or a combination thereof.

9. The apparatus of claim 6, in which the comfort component includes one or more of a temperature adjuster, a fan, a fan speed, an air direction, a seat heater, or a seat cooler.

10. The apparatus of claim 6, in which the comfort component is in the deactivated state prior to the first passenger entering the vehicle.

11. A non-transitory computer-readable medium having program code recorded thereon for controlling a comfort component of a vehicle, the program code executed by a processor, and, when executed by the processor configured:

to capture an image of a first passenger approaching the vehicle via one or more sensors of the vehicle;

to set the comfort component to a default state based on an identity of the first passenger being different from an identity of a previous passenger, the identity of the first passenger being determined based on the image;

to receive an input to adjust a temperature within the vehicle to a first passenger desired temperature, the input being received while the first passenger is occupying the vehicle;

to set the comfort component, while the first passenger is occupying the vehicle, to an active state to adjust the temperature to the first passenger desired temperature based on receiving the input;

to determine the first passenger exited the vehicle at a passenger drop-off location after activating the comfort component;

to determine an amount of time between the first passenger exiting the vehicle and the subsequent pick-up for a second passenger based on determining the first passenger exited the vehicle, the second passenger being different than the first passenger; and to control the comfort component based on the amount of time between the first passenger exiting the vehicle and the subsequent pick-up for the second passenger, the controlling comprising:

setting the comfort component to a deactivated state based on the amount of time being greater than a time threshold and the first passenger exiting the vehicle, the deactivated state being maintained until the second passenger enters the vehicle; and maintaining the comfort component in the active state based on the amount of time being less than the time threshold and the first passenger exiting the vehicle, such that the temperature within the vehicle is maintained at the first passenger desired temperature until the second passenger enters the vehicle.

12. The non-transitory computer-readable medium of claim 11, in which the program code is further configured to determine the first passenger exited the vehicle based on an indication from at least one of a door sensor, a seat pressure sensor, a visual sensor, a vehicle motion sensor, or a combination thereof.

13. The non-transitory computer-readable medium of claim 11, in which the program code is further configured to determine the vehicle arrived at the passenger drop-off location based on at least one of a motion of the vehicle, an indication from a location sensor, or a combination thereof.

14. The non-transitory computer-readable medium of claim 11, in which the comfort component is in the deactivated state prior to the first passenger entering the vehicle.

15. The non-transitory computer-readable medium of claim 11, in which the comfort component includes one or more of a temperature adjuster, a fan, a fan speed, an air direction, a seat heater, or a seat cooler.

* * * * *